United States Patent
Mogensen

(10) Patent No.: US 11,444,559 B2
(45) Date of Patent: Sep. 13, 2022

(54) OPERATIONAL MODE CONTROL OF A MOTOR

(71) Applicant: TEXAS INSTRUMENTS INCORPORATED, Dallas, TX (US)

(72) Inventor: Kristen N. Mogensen, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 59 days.

(21) Appl. No.: 17/148,245

(22) Filed: Jan. 13, 2021

(65) Prior Publication Data

US 2021/0135609 A1    May 6, 2021

Related U.S. Application Data

(63) Continuation of application No. 16/704,149, filed on Dec. 5, 2019, now Pat. No. 10,924,040, which is a continuation of application No. 16/009,534, filed on Jun. 15, 2018, now Pat. No. 10,523,144.

(51) Int. Cl.
*H02P 6/21* (2016.01)

(52) U.S. Cl.
CPC ................... *H02P 6/21* (2016.02)

(58) Field of Classification Search
CPC .................. H02P 6/21; H02P 6/182
USPC ................ 318/400.11, 400.09, 400.01, 700
See application file for complete search history.

(56) References Cited

U.S. PATENT DOCUMENTS

| | | | |
|---|---|---|---|
| 4,047,083 A | 9/1977 | Plunkett | |
| 5,739,652 A | 4/1998 | Sriram | |
| 6,339,303 B1 | 1/2002 | Heeren | |
| 6,754,151 B2 | 6/2004 | Watt | |
| 7,141,949 B2 | 11/2006 | Harwood | |
| 7,235,941 B2 | 6/2007 | Park et al. | |
| 7,378,810 B1 | 5/2008 | Sutardja et al. | |
| 8,896,246 B2 * | 11/2014 | Kern ................. | H02P 6/20 |
| | | | 318/400.11 |
| 2008/0231218 A1 | 9/2008 | Oh et al. | |

* cited by examiner

*Primary Examiner* — David Luo
(74) *Attorney, Agent, or Firm* — Krista Y. Chan; Charles A. Brill; Frank D. Cimino

(57) ABSTRACT

One example is a system for controlling a motor during startup. The system includes measurement logic, pattern detection logic, and mode logic. The measurement logic monitors a back-electromotive force (BEMF) signal representing a BEMF of an electric motor and the pattern detection logic monitors this signal to detect instances of the monitored BEMF signal exhibiting a predetermined pattern. The mode logic enables control of the electric motor according to a plurality of modes of control. In some examples, the mode logic initially employs a first mode of control and switches from the first mode of control to a second mode of control in response to the pattern detection logic detecting that a BEMF signal exhibits the predetermined pattern over a plurality of commutation states.

20 Claims, 6 Drawing Sheets

OPERATIONAL MODE CONTROL OF A MOTOR

CROSS-REFERENCE TO RELATED APPLICATIONS

This application is a continuation of U.S. patent application Ser. No. 16/704,149 filed on Dec. 5, 2019, which is a continuation of U.S. patent application Ser. No. 16/009,534, filed Jun. 15, 2018, now U.S. Pat. No. 10,523,144, each of which is incorporated herein by reference in its entirety.

TECHNICAL FIELD

This disclosure relates generally to the operational mode control of a motor.

BACKGROUND

Various types of electrical motors may need to transition between operational modes. For example, block-commutating permanent magnet synchronous motors (PMSMs) may begin operation in a first mode (e.g., an open-loop initialization mode) where forced commutation is used and a stator generates a rotating magnetic field that begins to rotate a rotor at low speeds. Once the rotor achieves a sufficient speed, a controller and/or switch may have the PMSM switched from the first-mode (initialization mode) to a second-mode that may be referred to as closed-loop or sensorless operating mode.

SUMMARY

One example is a system that includes measurement logic, pattern detection logic, and mode logic. The measurement logic measures a back-electromotive force (BEMF) signal representing a BEMF of an electric motor. The pattern detection logic detects instances of the monitored BEMF signal exhibiting a predetermined pattern. The mode logic enables control of the electric motor according to a plurality of modes of control. The mode logic initially employs a first mode of control and switches from the first mode of control to a second mode of control in response to the pattern detection logic detecting that a BEMF signal exhibits the predetermined pattern over a plurality of commutation states.

Another example is a method. The method includes measuring back electromotive force (BEMF) signals of a motor during each of a plurality of commutation states of the motor. The method also includes detecting one-or-more periodic characteristics associated with a back-electromotive force signal (BEMF signal) during each of the plurality of commutation states of the motor. The motor also includes switching the motor from a first control mode to a second control mode in response to detecting that the predetermined pattern occurs in a plurality of consecutive commutation states.

An example system includes sensor circuitry to provide a measure of the back electromotive force (BEMF) for a floating phase of a multi-phase electric motor. A controller has outputs to provide control signals to control operation of the multi-phase electric motor. The controller is configured to utilize a non-BEMF based first mode of control to initially control the multi-phase electric motor. The controller is also configured to detect each occurrence of a pattern in the sensor signal that includes crossing a predetermined signal value during a selected commutation state of the multi-phase electric motor. The controller is further configured switch from the first mode of control to a BEMF-based mode of control in response to detecting occurrences of the pattern over a plurality of consecutive commutation states.

DETAILED DESCRIPTION

This disclosure provides systems and methods to switch an electric motor from an initialization mode to a closed-loop (e.g., sensorless) mode.

By way of example, a system may measure the back-electromotive-force (BEMF) (e.g., BEMF voltage) of one or more phases of an electric motor (e.g., a three-phase permanent magnet synchronous motor (PMSM)). In response to recognizing a predetermined signal pattern in the BEMF voltage, the motor may be switched from an initial, low speed control mode to a closed-loop control mode. For example, during low-speed, open-loop control, a motor controller or other circuitry may monitor and evaluate the BEMF signals for a given current speed and/or reference current for the motor. If the predetermined pattern is not detected at the given speed and/or reference current, the speed and/or reference current signals may be increased (e.g., incrementally) during the initial open-loop control mode for additional evaluation of the BEMF. The BEMF thus may be monitored to detect the pattern in each commutation state while changing the speed and/or current parameters of the motor during the open-loop control mode until the predetermined BEMF pattern is detected over a plurality of commutation states. For example, the predetermined pattern may correspond to the BEMF signal crossing a predetermined voltage (e.g., a midpoint or zero crossing) during a selected commutation state for a given phase (e.g., while the phase is floating). Once the pattern of crossings is detected over a number of commutation states, which itself may constitute the predetermined pattern, the motor controller or other circuitry may automatically transition operational control from the initial (e.g., open-loop) control to closed-loop control (e.g., BEMF-based, sensorless control).

Figure 1:
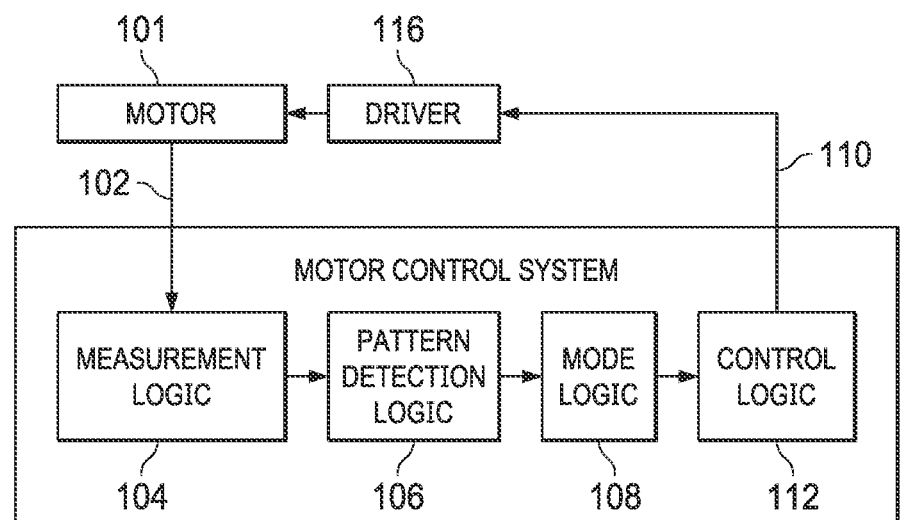
FIG. 1 illustrates an example system to control switching between different control modes of an electric motor.

FIG. 1 illustrates an example of a motor control system 100 configured to control a motor 101. The system 100 includes logic (e.g., implemented in a motor controller) that is configured to switch between operational modes of an electric motor. For example, during start-up of the motor, the system 100 enables automatic transition between low-speed, open-loop control and BEMF-based, sensorless control at higher speeds of operation. The example system 100 includes measurement logic 104, pattern detection logic 106, mode logic 108, and control logic 112. The control logic 112 is coupled to a driver 116 that is configured to supply electric current to phase windings of the motor 101 in response to control signals provided by the control logic 112. In some examples, some or all of the logic may be fabricated as part of a motor controller implemented on a common substrate (e.g., integrated in a common chip or die). For example, the control system 100 and its logic blocks may be implemented as hardware on a silicon chip, in an integrated circuit, in a field-programmable gate-array (FPGA), with discreet logic devices. In other examples, the logic may be implemented in an arithmetic logic unit (ALU), which may be a standalone ALU or within a processor core. Thus, the functionality implemented by the logic in the motor control system 100 may be implemented in a variety of ways.

In one example, the measurement logic 104 includes voltage measurement circuitry configured to measure the BEMF for each phase of the motor 101 such as via one or more connections 102. While in the example of FIG. 1, the measured signals are shown received via line(s) 102 from the motor, such signals alternatively may be measured by sensing voltages from the driver 116 via corresponding sensing circuitry. The measurement logic 104 is configured to measure BEMF signal voltages provided by each phase of the motor 101 and provide the measurements to the pattern detection logic 106 for subsequent processing. In some examples, the measurement logic 104 may implement digital processing of measured signals for further evaluation by the pattern detection logic 106.

As a further example, the measurement logic 104 periodically samples the BEMF signals at a sample rate, such as with an analog-to-digital converter (ND converter) that converts the BEMF signals into digital data for further analysis by the pattern detection logic 106. Signals converted from analog to digital data can include BEMF voltage signals generated by each floating phase of the motor 101. In an example three-phase PMSM, only two phases conduct current at any time, leaving the third phase floating, which depends on the current commutation state. The measurement logic 104 thus may take several (e.g., periodic) measurements of the BEMF signal of a respective floating phase as that signal travels through one or more commutation periods of the motor 101. The measurements of the BEMF signal from each floating phase thus is measured and provided to the pattern detection logic 106.

The pattern detection logic 106 receives, as inputs, measurements of the BEMF signals provided by the measurement logic 104 over time. The pattern detection logic 106 is configured to detect instances of the monitored BEMF signal exhibiting a predetermined pattern. In response to detecting the predetermined pattern, the pattern detection logic 106 may enable (or instruct) the mode logic 108 to switch from an initial (e.g., open-loop) mode of control to a different (e.g., closed-loop) mode of control.

For example, the pattern detection logic 106 is configured to identify each instance of the predetermined pattern based on the measured BEMF signal (e.g., from measurement logic 104) crossing a predetermined signal value during a selected commutation state of the electric motor 101. An example predetermined voltage is zero volts (e.g., a zero crossing) for a floating phase of the motor, although other voltage levels may be used. In some examples, the pattern detection logic 106 may detect that the predetermined pattern (e.g., zero crossing) occurs in each a plurality of consecutive commutation states. For instance, the pattern detection logic 106 may count a number of consecutive valid crossings that occur and store the count value in memory. The pattern detection logic 106 may reset the count value in response to detecting that the BEMF signal does not exhibit the predetermined pattern during any of the plurality of commutation states. The mode logic 108 thus may monitor or receive the count value to control whether or not to switch to the next control mode, as disclosed herein. In other examples, the pattern detection logic 106 may utilize additional or different patterns based on various signals or other characteristics that are useful for determining when it is desirable to switch the mode of the motor 101. As yet another example, the measurement logic 104 and pattern detection logic 106 may be implemented as hardware, such as a comparator to compare the measured BEMF voltage for each phase relative to a voltage threshold (e.g., a mid-point of the BEMF voltage).

The mode logic 108 is configured to control an operating mode of the electric motor 101 according to one of a plurality of modes of control. For example, the control modes can include a non-BEMF based control mode during low speeds and a closed-loop (e.g., sensorless) control mode at higher speeds. For example, the control mode for low speeds may utilize open-loop or closed-loop control and a BEMF-based control may be used for higher speeds. The mode logic 108 thus may switch between its control modes based on pattern detection information determined by the pattern detection logic 106. For example, the mode logic 108 is configured to initially (e.g., during start up) employ open-loop control and switch from such open-loop control to a closed-loop control in response to the pattern detection logic 106 detecting that BEMF signals exhibit the predetermined pattern over a plurality of commutation states, such as disclosed herein. As an example, the mode logic implements a state machine that transitions between control modes based on detecting (or not detecting) a pattern in the BEMF signals.

Control logic 112 is configured to set speed and/or current applied to the electric motor 101. For example, the control logic 112 is coupled to inputs of the driver 116, such as to supply PWM signals to switch devices (e.g., transistors) that are activated and deactivated to supply electric current to phase windings of the motor 101 according to a commutation state of the motor. The control logic 112 thus implements a mode of control (e.g., low-speed or closed-loop control) based on instructions from the mode logic 108. The control logic 112 may implement a cascaded control using speed and current or use only speed or only current during low speed control of the motor 101.

As an example, during the first mode of control (e.g., during start up at low speeds), in response to detecting that the BEMF signal fails to exhibit the predetermined pattern during at least one of the plurality of commutation states, the control logic 114 adjusts speed and/or current applied to the electric motor. For example, the control logic 114 incrementally adjusts (e.g., increases) speed and/or current applied to the electric motor 101 over consecutive time intervals during the first operating mode until the pattern detection logic 106 detects the predetermined pattern in a series of consecutive commutation states. As mentioned, the mode logic 108 switches from the first (e.g., non-BEMF) mode of control to the second (closed-loop) mode of control based on the predetermined pattern being detected in a series of consecutive commutation states of the motor. The control logic 112 uses the mode of control (e.g., established by mode logic 108) as well as the speed and/or reference current setting to implement corresponding control of associated drive circuitry.

The control logic 112 provides control signals to the drive circuitry 116 for controlling the motor 101 based on the control mode determined by the mode logic 108. The drive circuitry 116 thus supplies current for exciting windings of the motor 101 based on control signals from the control logic 112. For example, as shown in FIG. 2, the drive circuitry 116 may include an H-bridge or other drive arrangement of switch (e.g., transistor) devices configured to supply current to respective pairs of windings based on control signals from a motor controller that includes the control logic 112.

Unlike other approaches for transitioning from open to closed-loop control, the systems and methods disclosed herein do not require a pre-defined motor speed or a motor current threshold. Rather, the operating mode transition occurs according to the BEMF voltages of the motor 101 as well as other useful/desirable operating conditions and/or system parameters. For example, at low motor speeds, the BEMF's signal to noise ratio (SNR) is too low to be used for BEMF sensor-less closed-loop motor control and this causes the rotor position detection to be unreliable. Thus, at low speeds, operation of the motor is generally limited to non-BEMF speed control (e.g., open-loop or forced commutation) that exhibits degraded performance compared to closed-loop speed control at higher speeds. However, as disclosed herein, the system 100 of FIG. 1 determines when the BEMF signal is sufficiently stable, by detecting a predetermined pattern in the BEMF signals, to switch to a closed-loop mode of control, such as a BEMF-based sensorless, closed-loop mode of control. In other examples, the control may transition from closed-loop (e.g., low speed, non-BEMF-based control, which may be sensorless or employ sensors) to another closed-loop mode of control (e.g., BEMF-based sensorless control). The type of non-BEMF based control implemented at lower speeds can vary depending on application requirements.

Figure 2:
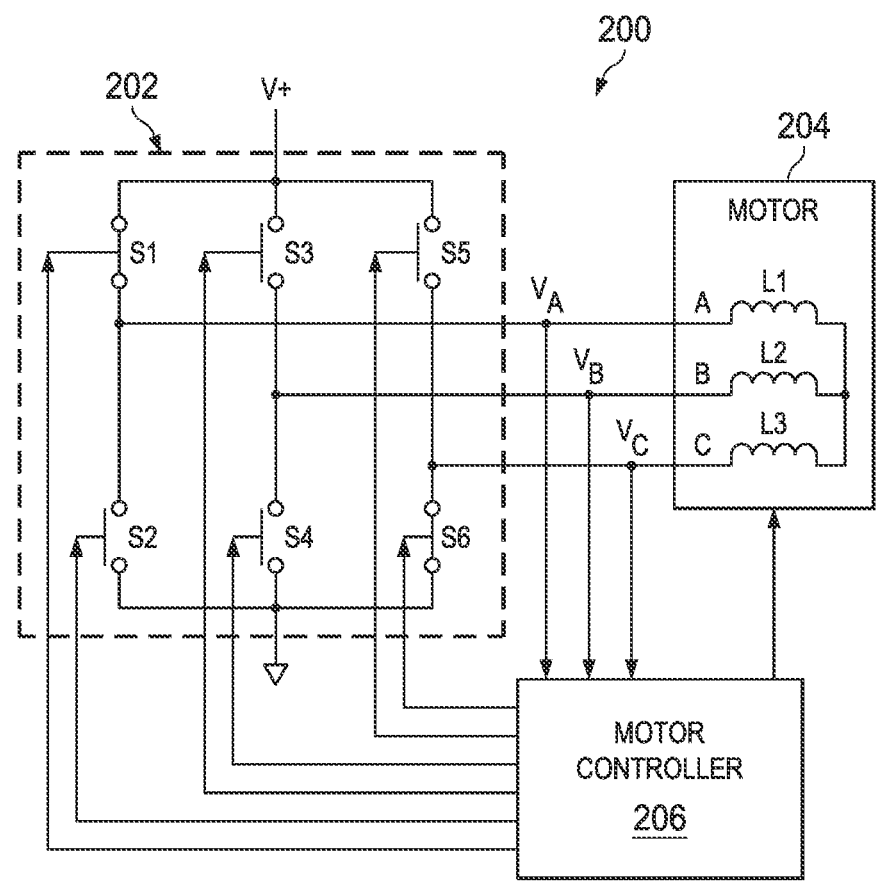
FIG. 2 illustrates an example of a motor circuit.

FIG. 2 illustrates an example of a motor system 200. The motor system 200 includes a driver 202 that is coupled to motor 204, demonstrated as a three phase motor having phase windings A, B and C. In the example of FIG. 2, the phase windings A, B and C each has an inductance shown as L1, L2 and L3, respectively. As one example, the motor may be a PMSM that includes three non-permanent electromagnetically activated magnets (electromagnets) mounted in its stator/housing and may have four permanent magnets mounted to its central rotor. However, other example motors may be employed in the examples herein with these other example motors having different numbers of permanent magnets and electromagnets. For example, the three electromagnets of the stator may be activated with six commutation states that work in pairs to generate the phase voltages (three-phased power supply) to rotate the motor.

The driver 202 includes an arrangement (e.g., H-bridge) of switch devices S1, S2, S3, S4, S5 and S6 (e.g., transistors, such as field-effect transistors or bipolar junction transistors). A motor controller 206 (e.g., corresponding to control system of FIG. 1) is coupled to control the switches of the driver 202 to generate output phase voltages $V_A$, $V_B$, and $V_C$ which are generally out-of-phase from each other (e.g., by 120 degrees). In this example, there are three upper switches S1, S3, and S5 connected to a high voltage supply V+ and three lower switches S2, S4, and S6 connected to a low (e.g., ground) voltage. The upper switches S1, S3, and S5 and the lower switches S2, S4, and S6 work in conjunction to supply current to the phase windings, which generate corresponding phase voltages $V_A$, $V_B$, and $V_C$. As disclosed herein, the motor controller 206 is configured to automatically switch the PMSM from an initialization mode (e.g., implementing open-loop or forced commutation control) to a run mode (e.g., closed-loop control) based on BEMF signals exhibiting a prescribed pattern. If appropriate, other signals and operating parameters associated with the motor operation may be utilized as part of the determination to change modes of control. The motor controller 206 may utilize the same BEMF signals, which are monitored to control transition between control modes, to sustain the motor 101 in the run mode during normal (high-speed, BEMF-based sensorless) operation. In at least some examples, the motor controller 206 supplies control signals to switches S1-S6 in a prescribed order in order to generate the three phase voltages ($V_A$, $V_B$, and $V_C$) to power the electromagnets in the stator that effect desired movement of the rotor.

Figure 3:
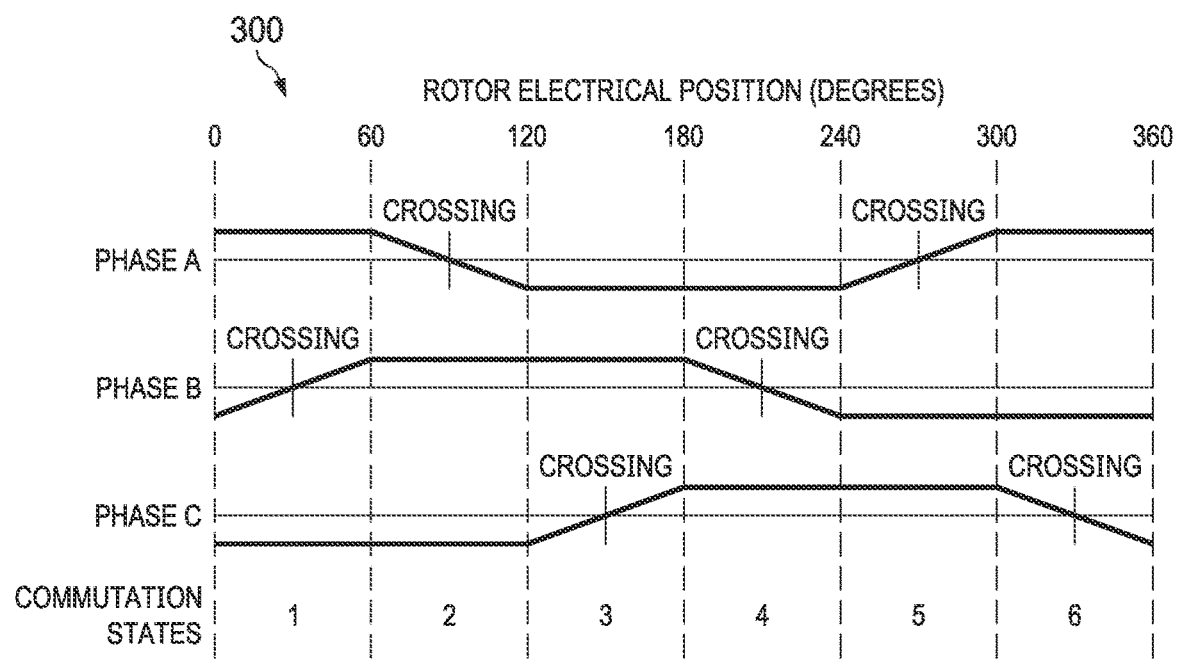
FIG. 3 is a graph showing an example of back-electromotive-force (BEMF) voltage waveforms over a plurality of commutation states.

FIG. 3 is a graph 300 illustrating various example ideal waveforms of a multi-phase motor, such as motor 101 or 204. FIG. 3 illustrates phase voltages for phases A, B and C at different rotor electrical positions and associated commutation states (e.g., six commutations states of 60 electrical degrees each). In some examples of motor control, PWM signals may drive switches S1-S6 (FIG. 2) on and off to generate the respective phase voltages $V_A$, $V_B$, and $V_C$. In this example, each of the phase voltages exhibits a crossing of a predetermined voltage (e.g., midpoint or zero crossing) centered near a selected commutation state, as respective floating phases ramp up or down.

Figure 4:
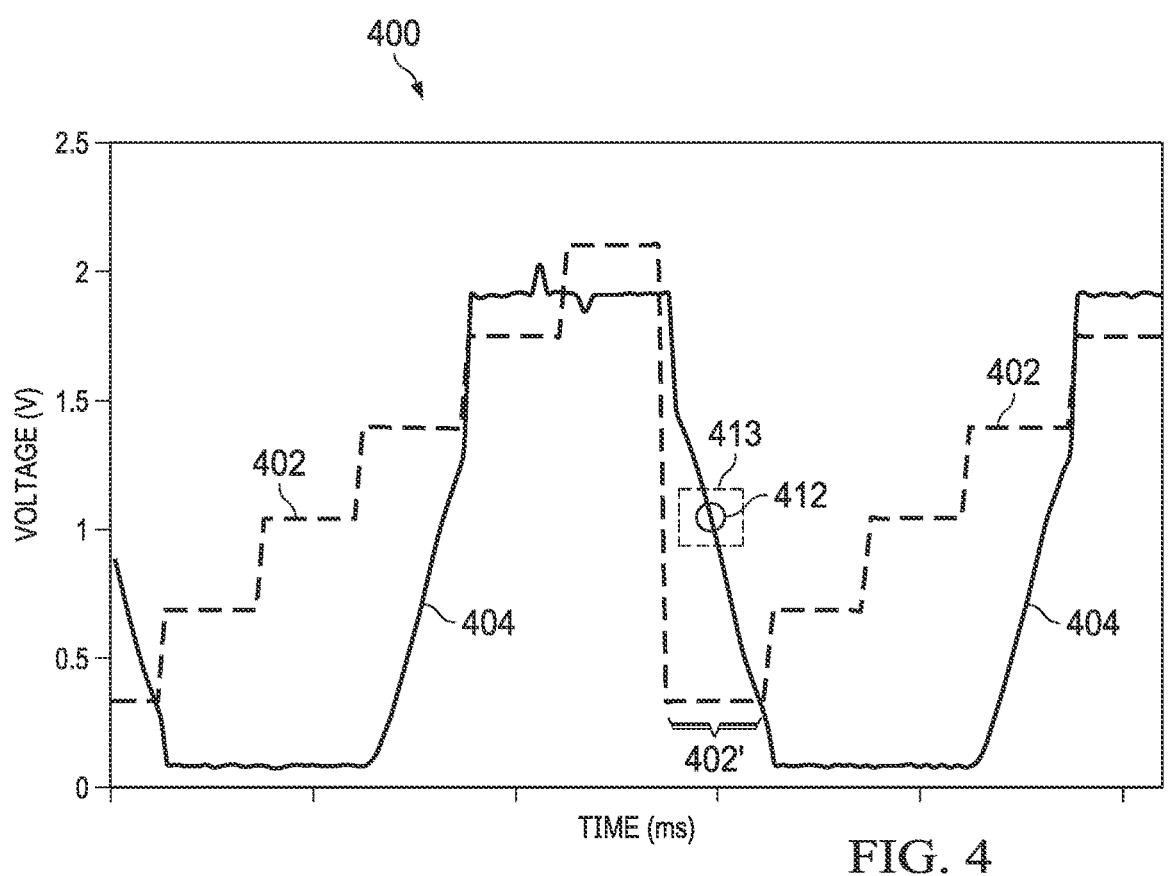
FIG. 4 is a graph illustrating an example BEMF waveform for a given phase over multiple commutation states.

FIG. 4 is a graph 400 illustrating an example phase voltage 404 for a given phase of a motor (e.g., motor 204) superimposed over motor commutation states 402. Additional phase and BEMF signals for different phases could have been graphed in FIG. 4 with other signals (see, e.g., FIG. 5); however, for the sake of clarity a single phase voltage waveform 404 is shown in the example of FIG. 4. As shown, during its floating phase, the phase voltage 404 decreases from its energized, high-voltage state (e.g., near about 2 V) to its low voltage state (e.g., about 0 V). The decreasing portion of the phase voltage corresponds to a BEMF generated for the given phase (during floating). In this example, the BEMF voltage crosses a predetermined voltage (e.g., a midpoint of about 1 V) that meets stability criteria. For example, the stability criteria includes the BEMF voltage having a zero or other predetermined crossing during a selected commutation state, which may be detected (e.g., by pattern detection logic) during the floating phase of the selected commutation state.

As disclosed herein, the measurement logic 104 (FIG. 1) measures the BEMF voltage waveform 404 during commutation states. When the measurement logic 104 measures the BEMF voltage of the phase voltage 404, the phase winding is floating (e.g., non-energized), such that the BEMF voltage waveform 404 decreases from its high to its low voltage amplitude. In the example of FIG. 4, the crossing is demonstrated to occur at point 412 (e.g., about 1V), which is valid crossing for the floating phase since it occurs during the selected commutation state (state 1 in this six commutation state example), indicated at 402'. The measurement of BEMF voltage for each phase (e.g., by measurement logic) may be triggered by commutation states when each respective phase is determined to be floating. As illustrated in FIG. 4, this may occur during a time interval of a respective commutation state 402'. In particular, the midpoint (e.g., zero) crossing of the BEMF voltage for the given phase, demonstrated at 412, may occur at an intermediate portion of the floating phase during commutation state 402'. The pattern detection logic is configured to detect each occurrence of the BEMF voltage crossing the predetermined voltage (e.g., valid crossings) for each phase of the motor.

As shown in FIG. 4, the crossing point 412 may further be determined (by pattern detection logic) to be a valid crossing if it occurs within a range of the midpoint or at a midpoint value. In some examples, the crossing point 412 may be also determined to be a valid crossing if it occurs at any time within the commutation period or within a prescribed time interval at or near a center of such commutation period. In this way, the pattern detection logic can condition the validity of a BEMF crossing as having both a component of voltage (e.g., crossing a predetermined voltage, such as zero) and a component of time (e.g., synchronized with a prescribed commutation state), which conditions are represented within a box 413 in FIG. 4. As discussed below, each of the other phase BEMF signals may be evaluated (by pattern detection logic) in combination with those of example FIG. 5 to determine that the existence of a pattern, including valid crossings, occurs over a plurality of consecutive commutation states for the motor.

Figure 5:
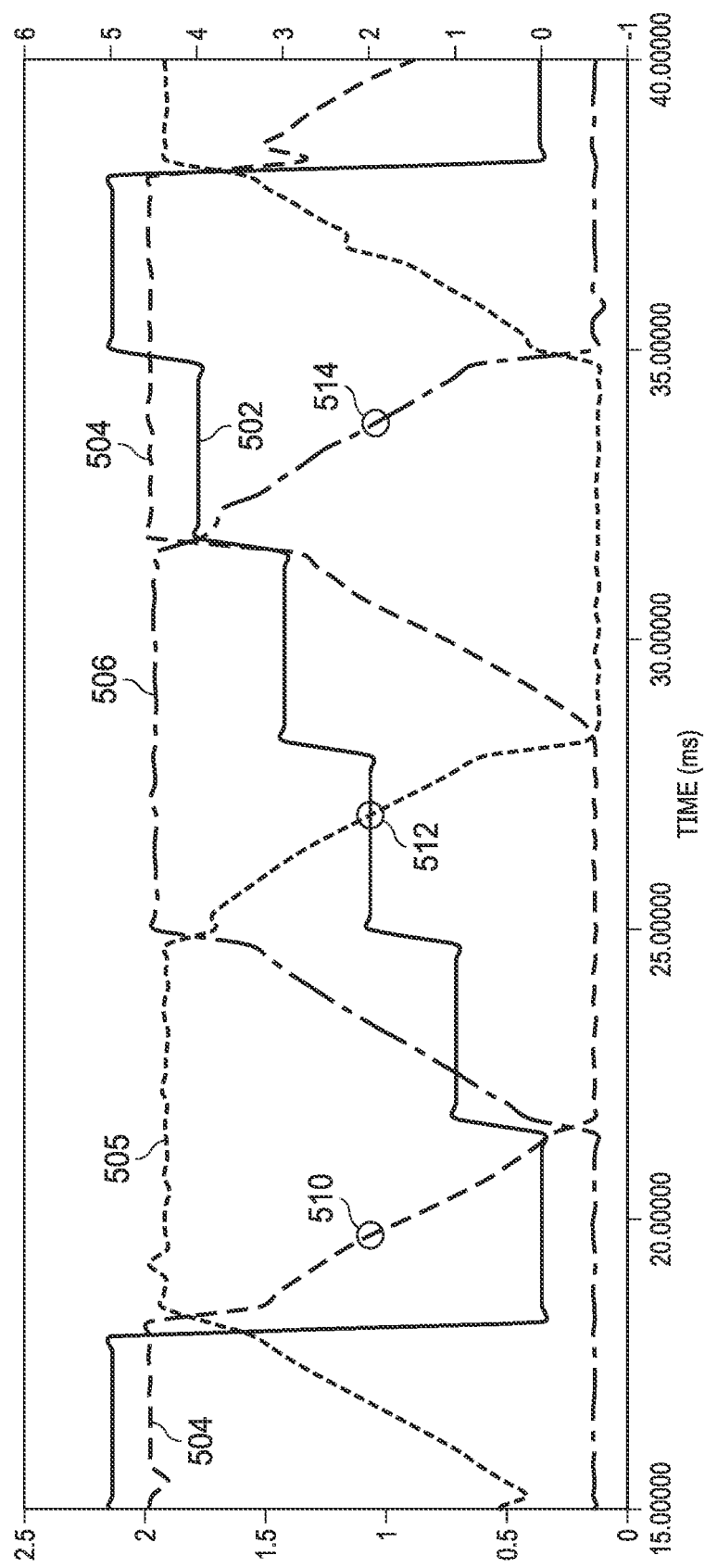
FIG. 5 is a graph of example BEMF waveforms for multiple phases over a plurality of commutation states.

FIG. 5 illustrates an example graph 500 of each of a plurality of phase voltages 504, 505 and 506 superimposed on commutation state signal 502. In the example of FIG. 5, the phase voltages 504, 505, 506 provide BEMF signals that cross predetermined voltage values (e.g., zero crossings), shown at 510, 512 and 514 during the corresponding commutation state for each respective floating phase. Accordingly, by detecting such pattern in the BEMF voltages signals over a series of commutation states, a motor controller can determine the operation of the motor system is sufficiently stable and switch from its closed-loop control to its open-loop control.

Figure 6:
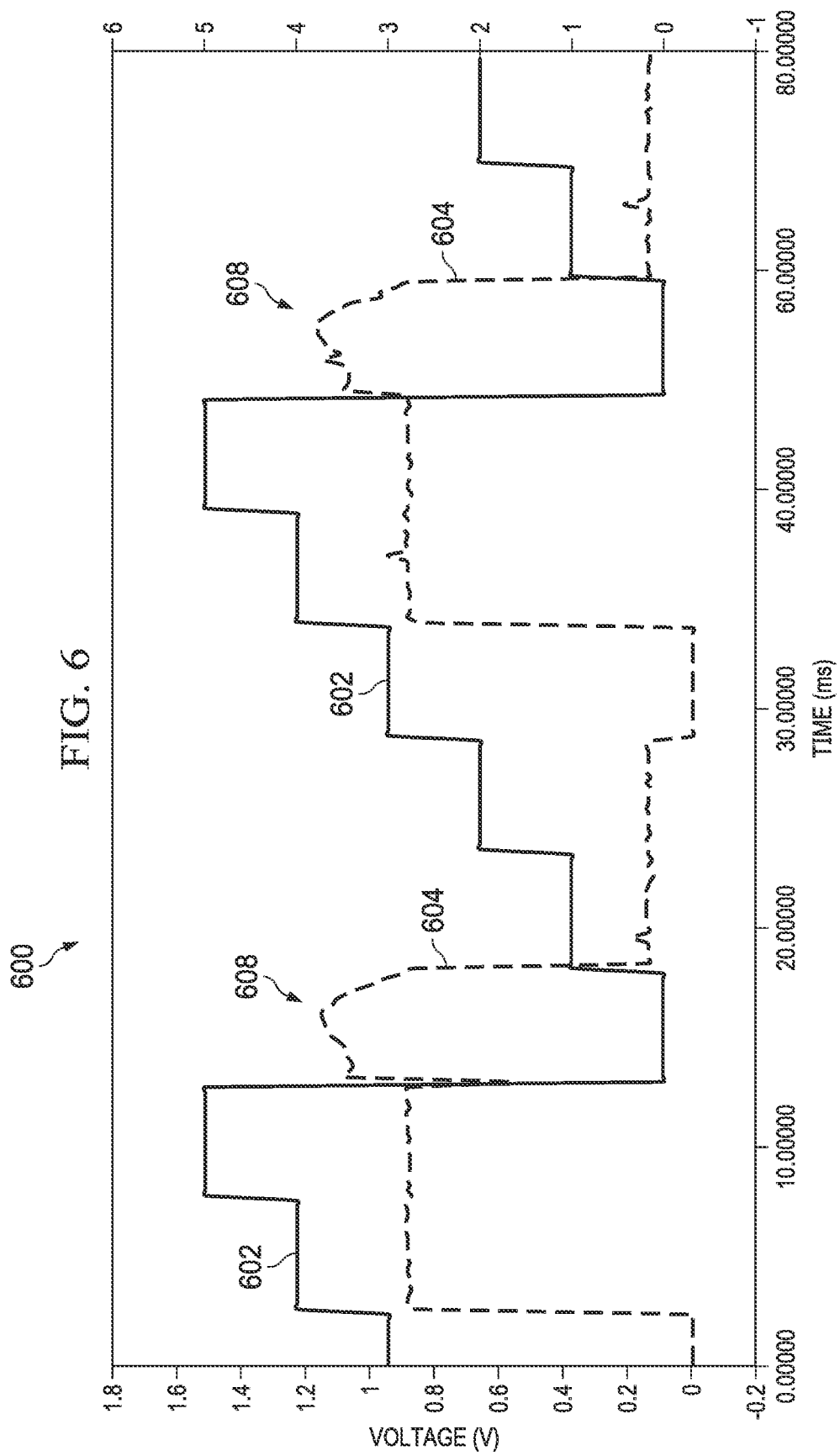
FIG. 6 is a graph illustrating an example BEMF waveform for a given phase over multiple commutation states lacking stability to change the control mode for a motor.

FIG. 6 illustrates an example graph 600 that depicts a commutation state signal 602 and a given phase voltage signal 604, similar to FIG. 4. In this example, the BEMF voltage transitions from a high voltage level to a low voltage value. However, in this example, the crossing of the predetermined voltage (e.g., zero crossing) does not occur during an expected commutation state for the floating phase. Instead, the crossing occurs in a subsequent commutation state of the motor, such that the crossing is not a valid crossing for purposes of pattern detection to enable switching the motor from the first-mode (e.g., open loop Low speed) to the second-mode (e.g., closed loop BEMF Sensorless). For example, arrows 608 generally indicate areas where the phase voltage signal 604 continues to increase during its expected floating phase period such that the threshold crossing occurs during a wrong commutation state. The example motor represented by the signals of FIG. 6 can be similar a motor discussed above that implements six commutation states for a block-commutated motor. The magnitude (or predetermined magnitudes) of BEMF voltage signal is dependent on motor frequency/speed and a supply voltage.

Figure 7:
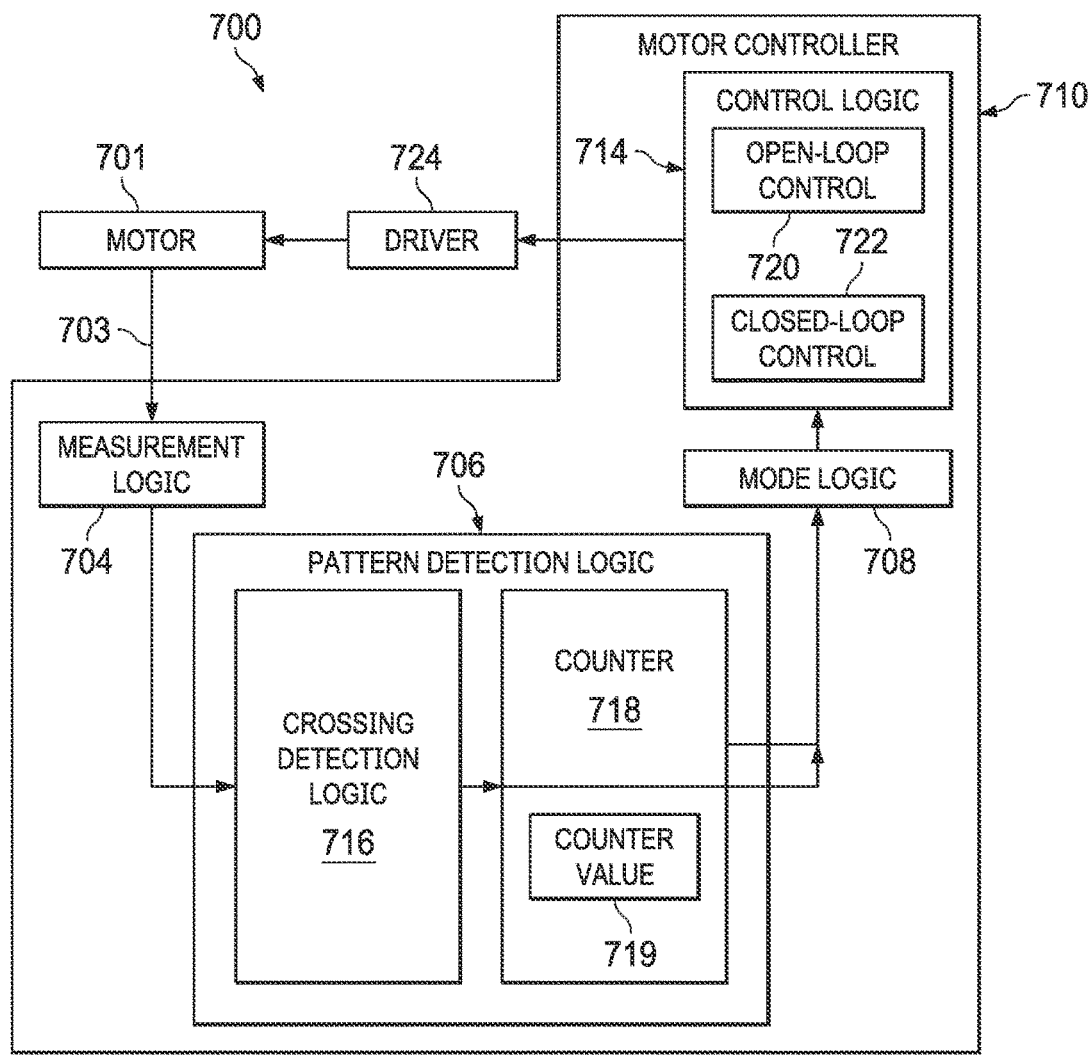
FIG. 7 illustrates an example of a motor system.

FIG. 7 illustrates an example of a motor system 700 that includes a motor controller 710 configured to implement logic that controls an electric motor 701. For example, the motor 701 may be a multi-phase (e.g., three-phase) PMSM, such as a brushless DC motor exhibiting trapezoidal or sinusoidal BEMF signals. In the example of FIG. 7, the motor controller 710 includes measurement logic 704, pattern detection logic 706, mode logic 708 and control logic 714. In other examples, the measurement logic 704 and associated phase sensing circuitry (not shown) could be implemented external or internal of the motor controller 710.

As disclosed herein, the measurement logic 704 receives BEMF signals for each phase of the motor 701 via one or more input connections 703. The measurement logic 704 may include voltage measurement circuitry that supplies the measured BEMF voltage signals to pattern detection logic 706, such as disclosed herein. In this example, the pattern detection logic 706 includes crossing detection logic 716 and a counter 718. The crossing detection logic 716 can detect each occurrence of the measured BEMF signal for a floating phase crossing a predetermined value (e.g., 0 V) during a corresponding commutation state of the motor, such as discussed above. For example, crossing detection logic 716 detects a zero or midpoint crossing of the BEMF signal for a given phase decrease from its positive to a negative voltage values during a commutation state while the given phase is floating.

The pattern detection logic 706 may also control the counter 718 to count each consecutive occurrence that the measured BEMF signal crosses the predetermined value (e.g., zero crossing). For example the counter 718 includes a counter value 719 tracking the number of times that the prescribed pattern of the BEMF occurs during consecutive commutation states. The counter 718 can store the counter value 719 in a register, a memory location, or similar location that is accessible by the pattern detection logic 706. The counter 718 further may be configured to reset the counter value in response to the crossing detection logic 716 detecting that the BEMF signal does not cross the predetermined value during one or more of the commutation states.

The mode logic 708 may be configured to operate similar to the mode logic 108 of FIG. 1. For example, the mode logic 708 is configured to switch between two or more control modes for the motor 701 based on the counter value 719, which can be accessed by or provided to the mode logic 708 by the pattern detection logic 706. For example, the mode logic 708 (and/or pattern detection logic 706) may compare the counter value 719 to predetermined threshold that establishes the number of consecutive zero crossings needed to switch from open-loop control to closed-loop control. The threshold may be a default value or be user-defined (e.g., programmable). As one example, the counter threshold may be set based on (or at) the number of commutation states that occur over 360 electrical degrees of the motor. In response to determining to switch between modes of operation, the mode logic 708 can provide a mode change command to the control logic 714.

The control logic 714 provides control signals to a driver 724 to apply corresponding current to phases of the motor 701. The control signals depend on speed and/or current values that the control logic sets for motor control. The control logic 714 may be implement open-loop control 720 or closed-loop control 722 depending on the mode of control established by the mode logic 708. During start up, while the motor is operating in its open-loop control operating mode, the control logic 714 incrementally adjusts the speed and/or current applied to the motor 701 over time. The incremental increase in speed and/or current may continue over time during the closed-loop control mode until the pattern detection logic 706 detects the predetermined pattern in a series of consecutive commutation states. For example, if the pattern is not detected during the series of consecutive commutation states or a predetermined time interval elapses, the control logic 714 increments the speed and/or current applied to the motor. Once the predetermined pattern is detected a threshold number of times in a series of consecutive commutation states, the mode logic 708 commands the control logic 714 to switch from the open-loop control 720 to the closed-loop control 722. The control logic 714 can further adjust at least one of the speed and/or current applied to the electric motor 701 in response to detecting that the BEMF signal fails to exhibit the predetermined pattern during at least one of the plurality of commutation states. In some examples, however, the pattern detection logic 706 may continue to look for the predetermined pattern in a series of consecutive commutation states and thereby control switching between the respective modes of control 720 and 722 being implemented by the control logic 714.

Figure 8:
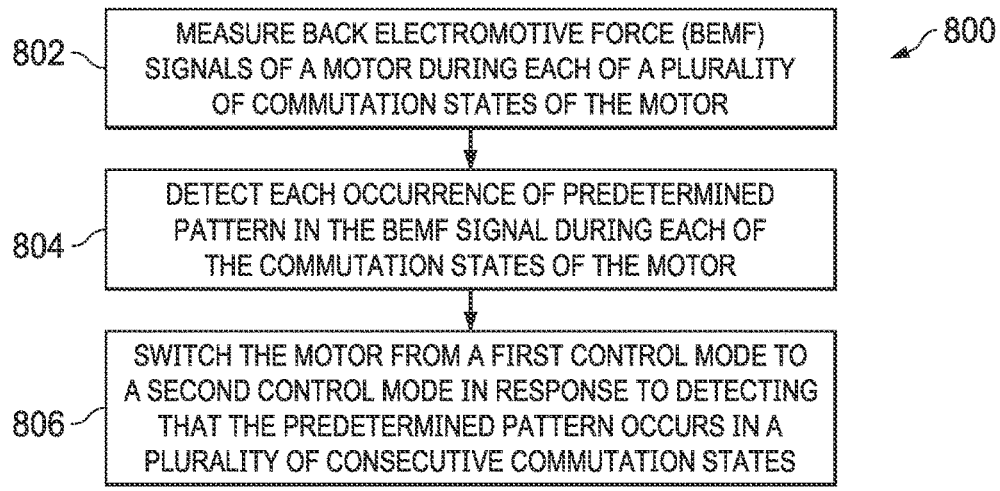
FIG. 8 illustrates an example flow diagram of a method to control switching between control modes of a motor.
Figure 9:
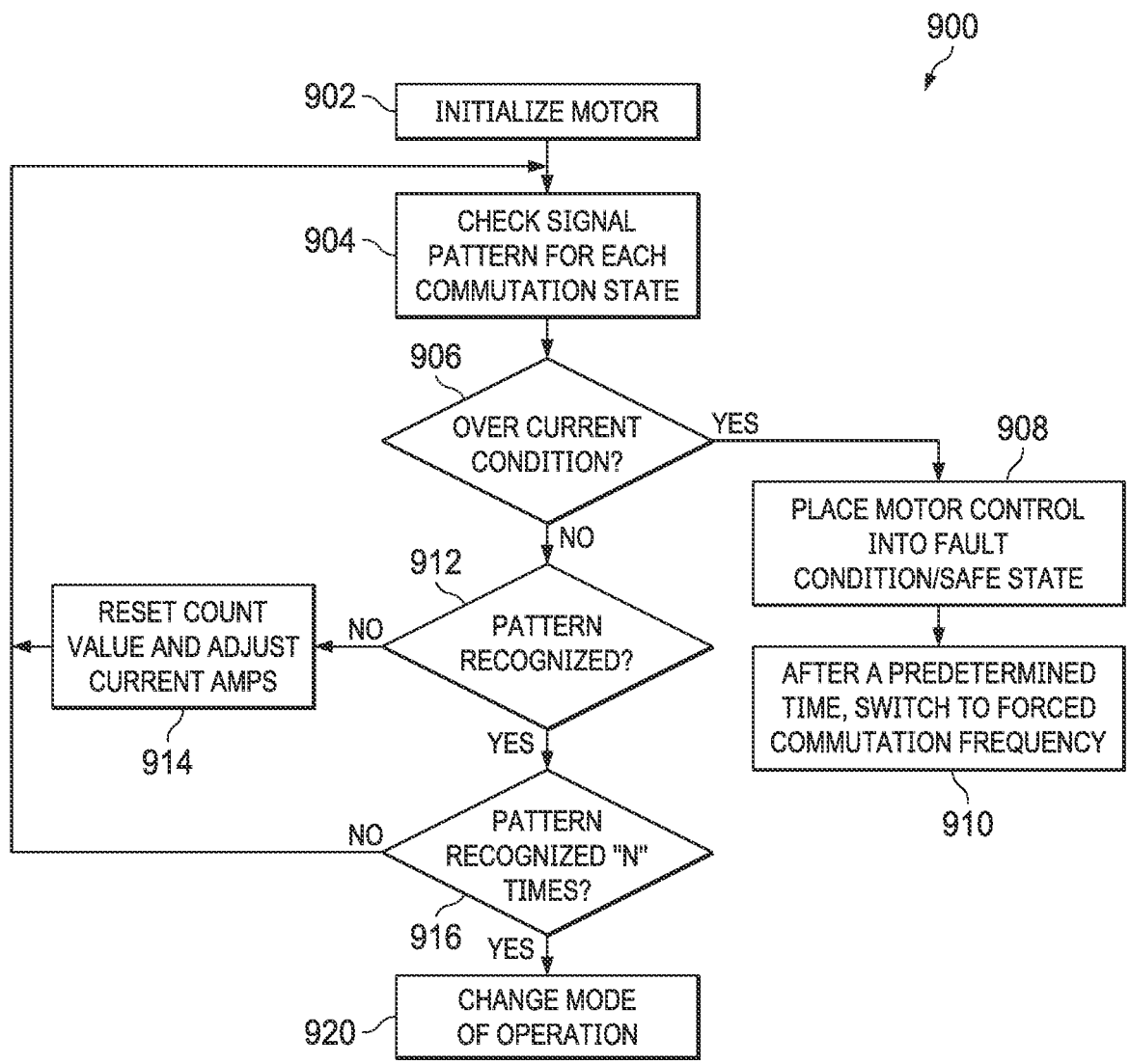
FIG. 9 illustrates another example flow diagram of a method to control switching between control modes of a motor.

In view of the foregoing structural and functional features described above, example methods will be better appreciated with reference to FIGS. 8 and 9. It is appreciated that the methods are not limited by the illustrated order. Some actions could occur, in other examples, in different orders and/or concurrently from that shown and described herein. Moreover, not all illustrated features may be needed to implement a method. For example, each of the methods of FIGS. 8 and 9 may, in some examples, be implemented in a motor controller to control a motor similar to as described above with reference to FIGS. 1-7.

FIG. 8 illustrates an example method 800 of controlling run modes for operating an electric motor 101. At 802, back electromotive force (BEMF) signal(s) of a motor are measured. For example, the BEMF signal(s) may be periodically measured during each of a plurality of commutation states of the motor. These measurements may be performed by measurement logic 104 or 704. Additionally, the first control mode may be maintained until the method 800 determines (as discussed below) that the predetermined pattern occurs in each of a plurality of consecutive commutation states.

The method 800 detects, at 804, occurrences of a predetermined pattern in the BEMF signal during each of the plurality of commutation states of the motor. In some examples, the detections may include periodic detections of one-or-more characteristics associated with the BEMF signal during each of the plurality of commutation states of the motor. For example, the detection may be performed by pattern detection logic 106 or 706.

At 806, the motor 101 is switched from a first control mode to a second control mode in response to detecting that the predetermined pattern occurs in a plurality of consecutive commutation states. This switching of the control modes thus is performed by control logic based on a mode determined by the mode logic, such as disclosed herein. In some examples, the method 800 includes counting a number of times the BEMF signal crosses a predetermined value during each of the respective commutation states. A counter may be reset in response to detecting that the BEMF signal for a floating phase does not cross the predetermined value during one of the commutation states. The motor may be switched from the first control mode to the second control mode if the counter is determined (e.g., by comparator) to have a count value that satisfies a predetermined threshold value.

For example, the electric motor may be operated in the second control mode (e.g., closed-loop operating mode) using a trapezoidal BEMF technique. Thus, the method 800 may automatically switch from the first operating mode to the second operating mode without interaction from an external actor, and without requiring a pre-defined motor speed or a motor current threshold. The approach disclosed herein is applicable to different types of motors and control schemes.

In some further examples, the method 800 may control at least one of speed or current applied to the motor. This can be performed by adjusting at least one of speed or current applied to the motor during a first mode of control in response to detecting that the BEMF signal fails to exhibit the predetermined pattern during at least one of the plurality of commutation states. The detecting and the switching may be repeated based on speed and/or current being applied to the motor, which speed and/or current may be adjusted over time.

FIG. 9 illustrates another example of a method 900 of controlling an electric motor 101, including switching between modes of control (e.g., between low-speed open-loop control and BEMF-based sensorless control). The method 900 begins, at 902, by initializing a motor. In some examples, the required motor initialization may be performed by a motor control logic similar to the control logic 112 of FIG. 1. This initialization may include starting the motor in a forced commutation mode, ramping up its commutation frequency until a minimum motor rotational speed is reached, and increasing the motor speed so as to begin generating BEMF signals. Once such speed is reached, the method 900 may proceed to 904.

At 904, a one or more one or more signals are evaluated for a predetermined signal pattern. For example, the signals being evaluated include BEMF waveforms for the respective phase windings in each commutation state. This checking may be performed by pattern detection logic (e.g., logic 106 or 706). For example, logic monitors and determines if a BEMF signal characteristic occurs, such as whether a zero crossing of one or more BEMF signals is present during a respective commutation period. In some examples, after or concurrently with 904, at 906, a determination is performed to determine if an overcurrent condition has occurred regarding the motor. If so, the motor 101 is placed into a fault condition (e.g., safe state), at 908, and, after a predetermined time the motor is switched, at 910, to its initial forced commutation frequency and the method returns to 902. A motor control logic (e.g., logic 112 or 714) may place the motor 101 into this fault condition.

If an over current condition was not detected at 906, then a determination is made as to if a pattern was recognized, at 912. Logic such as the pattern detection logic 106 or 706 discussed above with reference to FIG. 1 may perform the determination at 912 and may contribute to determining if a predetermined pattern was recognized (detected). As disclosed herein, the pattern may correspond to a predetermined BEMF signal pattern in which one or more BEMF voltage signals cross a predetermined voltage (e.g., zero crossings) during one or more commutation states. In some examples, the predetermined BEMF signal pattern corresponds to detecting each of the BEMF voltage signals crossing a predetermined voltage (e.g., zero crossings) during a plurality of consecutive commutation states. For each detection of the predetermined pattern, a count value is incremented to track each valid crossing. If the pattern is not recognized during a commutation state, then the count value is reset, at 914, and a current driven to the motor is adjusted. For example, the current may be adjusted by using an incremental up or down current amperage. Thus, while the signal doesn't match the expected pattern, the reference current and/or speed values in the open-loop control are changed after a certain number of commutations. From 914, the method returns to block 904.

If there is a recognized pattern at 912, then a determination is made, at 916 as to if the pattern was recognized "N" (a threshold) number of times. For example, a counter (e.g., counter 718) may provide a corresponding counter value to represent the number of valid crossings detected over a series of commutation states. If the pattern is not recognized at 916, then the method returns to block 904. In response to detecting the predetermined pattern, at 916, "N" number of times, the method proceeds to 920 where a control mode of the motor may be changed. For example, the mode change at 920 can correspond to switching from an open-loop (e.g., forced commutation) control mode to a closed-loop (e.g., BEMF-based sensorless) control mode. As mentioned, the mode logic 108, 808 discussed above may be provided information as to whether the pattern was recognized "N" times to enable switching between respective modes as disclosed herein. In one example, "N" may be set to N≥6, which would reflect two detections per phase in a three-phase motor. In other examples, different values of "N" may be used. Additionally, or alternatively, the value of "N" may be set to a default value (e.g., N=6) or be user programmable (e.g., a register entry set in response to a user input).

In view of the foregoing, employing the above description and figures explained example systems and methods that may eliminate a lengthy manual tuning to find a minimum speed and current needed to generate run time signal(s) from the a motor that can include the BEMF signal(s). Eliminating manual tuning enables faster time to market and applicability to a variety of different motor configurations and operating conditions. Unlike implementations that may use previously chosen speed and current values that were fixed and specific to the motor and load conditions, the approach herein affords automatic mode changes that increase system robustness and flexibility.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A method comprising:
receiving, by pattern detection logic, a signal generated by a motor having a plurality of commutation states and operating in a first control mode;
determining, by the pattern detection logic, a predetermined signal pattern in the signal generated by the motor;
incrementing, by the pattern detection logic, a count value based on a number of times over a set of the plurality of commutation states that the predetermined signal pattern is determined in the signal; and
in response to the count value exceeding a count threshold, selecting, by the pattern detection logic, a second control mode to operate the motor.

2. The method of claim 1, wherein:
the signal comprises a back-electromotive force (BEMF) signal; and
the signal corresponds to the BEMF signal crossing a predetermined voltage during a selected commutation state of the plurality of commutation states.

3. The method of claim 1, further comprising:
initializing, by a motor control logic, the motor, wherein the initializing includes starting the motor in the first control mode and increasing a commutation frequency of the motor from a first commutation frequency until the motor generates the signal.

4. The method of claim 3, further comprising:
determining, by the motor control logic, whether an overcurrent condition with the motor exists.

5. The method of claim 4, further comprising:
in response to the overcurrent condition existing with the motor, placing, by the motor control logic, the motor in a fault condition.

6. The method of claim 5, further comprises:
in response to placing the motor in the fault condition, switching, by the motor control logic, the motor to the first commutation frequency.

7. The method of claim 3, further comprising:
in response to determining the predetermined signal pattern is not determined in the signal, resetting the count value; and
increasing, by the motor control logic, the commutation frequency.

8. The method of claim 1, wherein:
the count threshold is set in response to a user input.

9. The method of claim 1, further comprising:
sampling, by a measurement logic, the signal periodically; and
converting, by the measurement logic, the signal into a digital signal.

10. The method of claim 9, wherein:
the sampling includes a plurality of measurements of the signal of a respective floating phase of one or more commutation periods of the motor.

11. A system comprising:
measurement logic operable to measure a signal associated with a motor having a plurality of commutation states;
pattern detection logic operable to:
receive the signal;
compare the signal to a predetermined signal pattern;
based on the comparison, increment a count value; and
in response to the count value exceeding a count threshold, generate a motor control selection to switch operation of the motor from a first control mode to a second control mode; and
mode logic operable to:
receive the motor control selection; and
operate the motor based on the motor control selection.

12. The system of claim 11, wherein the measurement logic is operable to:
measure the signal periodically.

13. The system of claim 11, wherein:
the signal comprises an analog signal; and
the measurement logic is operable to convert the analog signal to a digital signal.

14. The system of claim 11, wherein the measurement logic is operable to:
measure the signal for a respective floating phase as the signal travels through one or more commutation periods of the motor.

15. The system of claim 11, wherein:
the pattern detection logic includes a comparator.

16. The system of claim 11, wherein the mode logic is operable to:
operate the motor in open-loop control in the first control mode; and
operate the motor in closed-loop control in the second control mode.

17. The system of claim 11, wherein the mode logic is operable to:
operate the motor in a first closed-loop control in the first control mode; and
operate the motor in a second closed-loop control in the second control mode.

18. A device, comprising:
pattern detection logic configured to:
- receive a signal generated by a motor having a plurality of commutation states and operating in a first control mode;
- compare the signal in a number of the plurality of commutation states with a predetermined signal pattern;
- based on the comparison, increment a count value; and
- in response to the count value exceeding a count threshold, selecting a second control mode to operate the motor.

19. The device of claim 18, wherein:
the count value is increased in response to the signal matching the predetermined signal pattern over a set of the plurality of commutation states.

20. The device of claim 18, wherein:
the count threshold is selected from one of a default value and a programmable value.

* * * * *